US012309907B2

(12) United States Patent
Matsumoto et al.

(10) Patent No.: US 12,309,907 B2
(45) Date of Patent: May 20, 2025

(54) ELECTRONIC DEVICE AND MANUFACTURING METHOD OF ELECTRONIC DEVICE

(71) Applicants: MATSUMOTO GIKEN CO., LTD., Koshu (JP); SHISHIDO ELECTROSTATIC, LTD., Tokyo (JP)

(72) Inventors: Yorioki Matsumoto, Koshu (JP); Nobuhiro Matsumoto, Koshu (JP); Shinichi Yamaguchi, Tokyo (JP); Ryuichi Takeuchi, Tokyo (JP)

(73) Assignees: MATSUMOTO GIKEN CO., LTD., Koshu (JP); SHISHIDO ELECTROSTATIC, LTD., Tokyo (JP)

( * ) Notice: Subject to any disclaimer, the term of this patent is extended or adjusted under 35 U.S.C. 154(b) by 181 days.

(21) Appl. No.: 18/010,629

(22) PCT Filed: Jun. 16, 2021

(86) PCT No.: PCT/JP2021/022887

§ 371 (c)(1),
(2) Date: Dec. 15, 2022

(87) PCT Pub. No.: WO2021/256513

PCT Pub. Date: Dec. 23, 2021

(65) Prior Publication Data

US 2023/0345608 A1 Oct. 26, 2023

(30) Foreign Application Priority Data

Jun. 17, 2020 (JP) ................................ 2020-104857

(51) Int. Cl.
*H05F 1/02* (2006.01)
*H01T 19/00* (2006.01)

(52) U.S. Cl.
CPC ............... *H05F 1/02* (2013.01); *H01T 19/00* (2013.01)

(58) Field of Classification Search
CPC ..... H05F 1/02; H05F 3/06; H05F 3/02; H01T 19/00; H01T 23/00; H01T 19/04
(Continued)

(56) References Cited

U.S. PATENT DOCUMENTS 5,276,080 A 1/1994 Oku
6,403,040 B1 6/2002 Sasakura et al.
(Continued)

FOREIGN PATENT DOCUMENTS

JP 5-226092 A 9/1993
JP 6-208898 A 7/1994
(Continued)

OTHER PUBLICATIONS

International Search Report, issued in PCT/JP2021/022887, dated Aug. 31, 2021.
(Continued)

*Primary Examiner* — Danny Nguyen
(74) *Attorney, Agent, or Firm* — Birch, Stewart, Kolasch & Birch, LLP

(57) ABSTRACT

An electronic device of the present invention is an electronic device used around a neutralization target object, the electronic device includes: an electric part; an interconnection portion that transmits electric power of a high voltage power supply to the electric part; and a housing that accommodates the electric part and the interconnection portion, in which the electronic device includes at least one of a cover portion, which covers at least a part of the electric part and has a surface resistivity of equal to or higher than $10^4 \Omega/\square$ and equal to or lower than $10^{11} \Omega/\square$, and the housing, which has
(Continued)

a surface resistivity of equal to or higher than $10^4 \Omega/\square$ and equal to or lower than $10^{11} \Omega/\square$.

14 Claims, 4 Drawing Sheets

(58) Field of Classification Search
USPC .................................................. 361/212, 213
See application file for complete search history.

(56) References Cited

U.S. PATENT DOCUMENTS

| | | | |
|---|---|---|---|
| 7,375,945 | B2 | 5/2008 | Izumi et al. |
| 11,075,505 | B2 | 7/2021 | Yasuoka et al. |
| 2002/0037243 | A1 | 3/2002 | Sasakura et al. |
| 2006/0232908 | A1 | 10/2006 | Izumi et al. |
| 2007/0217090 | A1 | 9/2007 | Takayanagi |
| 2008/0273282 | A1 | 11/2008 | Takayanagi |
| 2016/0031568 | A1* | 2/2016 | Yokoi ...................... H01Q 1/50 244/1 A |
| 2019/0123519 | A1* | 4/2019 | Yasuoka ................. H01T 19/00 |
| 2022/0242117 | A1* | 8/2022 | Cooke ...................... B41J 2/095 |

FOREIGN PATENT DOCUMENTS

| | | | |
|---|---|---|---|
| JP | 6-231897 | A | 8/1994 |
| JP | 2001-203094 | A | 7/2001 |
| JP | 2002-289394 | A | 10/2002 |
| JP | 2005-142131 | A | 6/2005 |
| JP | 2005-222868 | A | 8/2005 |
| JP | 2005-243558 | A | 9/2005 |
| JP | 2007-234437 | A | 9/2007 |
| JP | 2011-238553 | A | 11/2011 |
| JP | 2012-221901 | A | 11/2012 |
| JP | 2013-54983 | A | 3/2013 |
| JP | 2014-10946 | A | 1/2014 |
| JP | 2016-72051 | A | 5/2016 |
| JP | 2018-88189 | A | 6/2018 |
| JP | 2018-190559 | A | 11/2018 |
| JP | 2019-75349 | A | 5/2019 |
| KR | 10-2018-0047162 | A | 5/2018 |
| WO | WO 2004/109875 | A1 | 12/2004 |

OTHER PUBLICATIONS

Written Opinion of the International Searching Authority, issued in PCT/JP2021/022887, dated Aug. 31, 2021.

* cited by examiner

ELECTRONIC DEVICE AND MANUFACTURING METHOD OF ELECTRONIC DEVICE

TECHNICAL FIELD

The present invention relates to an electronic device and a manufacturing method of the electronic device.

BACKGROUND ART

Various developments have been made on electrostatic measures in an electronic part, an electronic machine, or a manufacturing process thereof. As this type of technology, for example, the technology described in Patent Document 1 is known. Patent Document 1 describes an ionizer including a discharge needle that generates ions by generating corona discharge (the claim 1 of Patent Document 1, or the like).

RELATED DOCUMENT

Patent Document

[Patent Document 1] Japanese Unexamined Patent Publication No. 2019-75349

SUMMARY OF THE INVENTION

Technical Problem

However, as a result of the examination by the inventor of the present invention, in the electronic device such as the ionizer described in Patent Document 1, it has been found that there is room for improvement in terms of alleviation of the induced electrification phenomenon with respect to a neutralization target object such as an electronic part or an electronic machine that is present around during use.

Solution to Problem

As a result of further examination by the inventor of the present invention, for an electronic device that includes an electronic part and a housing and that is driven by a high voltage power supply, by appropriately controlling a surface resistivity of a cover portion and/or the housing that cover the electric part, it has been found that the induced electrification phenomenon, which occurs with respect to a neutralization target object that is present around the electronic device during use, can be alleviated, and the present invention has been completed.

According to the present invention, there is provided an electronic device that is used around a neutralization target object, the electronic device includes: an electric part; an interconnection portion that transmits electric power of a high voltage power supply to the electric part; and a housing that accommodates the electric part and the interconnection portion, in which the electronic device includes at least one of a cover portion, which covers at least a part of the electric part and has a surface resistivity of equal to or higher than $10^4\Omega/\square$ and equal to or lower than $10^{11}\Omega/\square$, and the housing, which has a surface resistivity of equal to or higher than $10^4\Omega/\square$ and equal to or lower than $10^{11}\Omega/\square$.

Further, according to the present invention, there is provided a manufacturing method of an electronic device that is used around a neutralization target object and that includes an electric part, an interconnection portion transmitting electric power of a high voltage power supply to the electric part, and a housing accommodating the electric part and the interconnection portion, the manufacturing method includes: an assembling process of obtaining the electronic device by assembling constituent parts of the electronic device by using at least one of a cover portion, which has a surface resistivity of equal to or higher than $10^4\Omega/\square$ and equal to or lower than $10^{11}\Omega/\square$ and covers at least a part of the electric part, and the housing, which has a surface resistivity of equal to or higher than $10^4\Omega/\square$ and equal to or lower than $10^{11}\Omega/\square$.

Advantageous Effects of Invention

According to the present invention, an electronic device and a manufacturing method of the electronic device capable of excellently alleviating an induced electrification phenomenon are provided.

DESCRIPTION OF EMBODIMENTS

Figure 1:
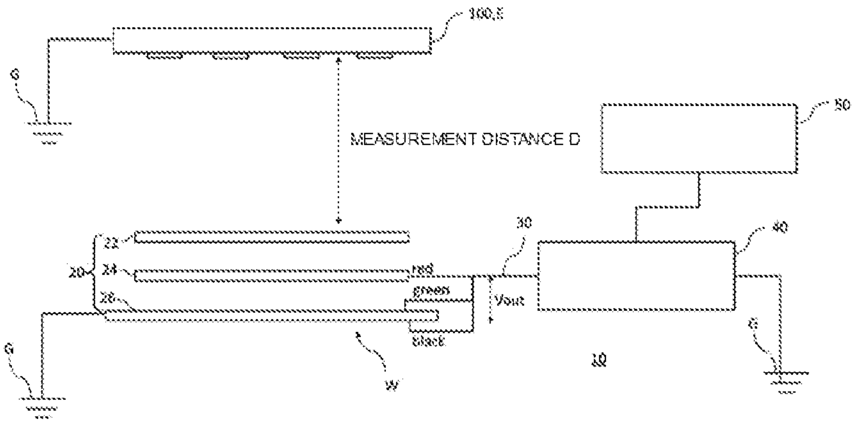
FIG. 1 is a diagram schematically showing a connection diagram of a measurement machine in a measurement system 10.

Hereinafter, embodiments of the present invention will be described with reference to the drawings. In all the drawings, the same constituents will be referred to with the same numerals, and the description thereof will not be repeated. Further, the drawings are schematic diagrams and do not correspond to actual dimensional ratios.

In the present embodiment, the front, rear, left, right, up, and down directions are defined as shown in the drawings. However, this is defined for convenience in order to simply explain the relative relationship of the constituent elements. Therefore, it does not limit the direction during the manufacture or use of the product embodying the present invention.

An electronic device according to the present embodiment will be outlined.

An electronic device of the present invention includes: an electric part; an interconnection portion that transmits electric power of a high voltage power supply to the electric part; and a housing that accommodates the electric part and the interconnection portion, in which the electronic device includes at least one of a cover portion, which covers at least a part of the electric part and has a surface resistivity of equal to or higher than $10^4\Omega/\square$ and equal to or lower than $10^{11}\Omega/\square$, and the housing, which has a surface resistivity of equal to or higher than $10^4\Omega/\square$ and equal to or lower than $10^{11}\Omega/\square$.

Such an electronic device is used around a neutralization target object, such as an electronic part or an electronic machine.

In manufacturing and assembling processes of the electronic part or the electronic machine, various electrostatic measures are adopted for the purpose of suppressing damage to products due to ElectroStatic Discharge (ESD).

As one of the electrostatic measures, the use of a neutralization device (an ionizer) is widely performed. The occurrence of ESD can be suppressed by the neutralization of the electrification charge in the electronic part or the electronic machine by the neutralization device. Examples of a reason for adopting the neutralization device include the fact that the device has relatively high safety, the fact that there are few restrictions on installation locations, and the fact that the handling is easy.

In recent years, as the electronic part or the electronic machine has become smaller, faster, operates at lower voltages, and has higher functionality, there is a risk that durability against ElectroStatic discharge (ESD) will decrease, thereby it has been required to set an electrostatic management voltage to a very low value on the order of several volts (V) to several tens of volts (V). For example, such a problem is conspicuous in a magnetic head slider process of a hard disk drive that is extremely sensitive to the electrostatic discharge, a CMOS image sensor, a SAW device, a high frequency device, an inverter in which a SiC technology is adopted, a laser diode, a white LED, a high brightness LED, and the like.

Based on the above background, as a result of the examination by the inventor of the present invention, in the manufacturing process of the electronic part or the electronic machine in which the electrostatic management voltage is set to low, it was found that there is a risk of causing electrostatic failure due to the induction of potential, even when ions do not flow into the neutralization target object, by an electric field caused by the high voltage power supply, when the neutralization device neutralizes the electrification charge of the neutralization target object.

In the development of neutralization devices so far, electrostatic measures are not established inside the neutralization devices. This is because, up until now, a relatively high standard is set for the electrostatic management voltage, and no attention or examination has been given to the induction electrification that occurs on the neutralization target object by the neutralization device. That is, even when the induction electrification by the neutralization device is excluded from examination items, by improving neutralization performance such as neutralization speed or an ion balance, it is possible to provide a neutralization device that is effective for electrostatic measures.

However, this time, a relatively low standard is set for the electrostatic management voltage on the order of several volts (V) to several tens of volts (V). In this case, the amount of induction electrification, which is generated on the neutralization target object by the neutralization device, is not a negligible level of the amount of electrostatic, and it has been clarified according to the inventor's knowledge that it is effective in suppressing the occurrence of ESD when the amount of induced charge is used as the electrostatic measures.

When a closer examination is performed, it has been found that the induced electrification phenomenon, which occurs with respect to the neutralization target object that is present around the neutralization device during use, can be alleviated, by appropriately controlling the surface resistivity of the housing of the neutralization device and/or the surface resistivity of the cover portion, which covers the electric part, to be equal to or lower than the upper limit value and equal to or higher than the lower limit value.

By making the surface resistivity equal to or lower than the above upper limit value, the movement of charges becomes smooth, and the induced voltage, which is generated in the neutralization target object W when the neutralization is performed, can be reduced as compared to an insulating material having a surface resistivity higher than $10^{11}\Omega/\square$. Further, by setting the surface resistivity equal to or higher than the lower limit value, an increase in the number of attracted ions generated from an electrode 130 can be suppressed, thereby deterioration in the neutralization performance of the ionizer 100 can be suppressed as compared to a conductive material having a surface resistivity lower than $10^{4}\Omega/\square$.

According to the present embodiment, by using the electronic device such as a neutralization device around the neutralization target object, it is possible to reduce the induced voltage, which is generated in the neutralization target object due to electrostatic induction, that is, it becomes possible to alleviate the induced electrification phenomenon.

As a result, in the manufacturing process of the electronic part or the electronic machine, it can be expected that the yield will be improved and the variation in quality will be reduced.

Further, according to one embodiment of the present embodiments, an electronic device such as a neutralization device capable of suppressing the occurrence of ESD can be provided even when a relatively low standard is set for the electrostatic management voltage of several volts (V) to several tens of volts (V).

The electronic device of the present embodiment will be described in detail below.

As the electronic device, for example, a corona discharge type neutralization device (ionizer), a light irradiation type neutralization device, or the like is used. The corona discharge type neutralization device includes a discharge needle (an electrode) that generates a corona discharge, and a voltage application method or a self-discharge method can be used. The light irradiation type neutralization device uses an ultraviolet method, a soft X-ray method, or an $\alpha$-ray method depending on the type of radiation.

Note that the electronic device may be a general electronic device other than the neutralization device as long as it is used around the neutralization target object in the electronic part, the electronic machine, or the manufacturing process thereof.

In the neutralization device, "Around" may mean a distance between the neutralization target object and the neutralization device when the neutralization processing is performed, and may also mean the neutralization target object is in the same room, on the same workbench, or over the production line with the neutralization device.

The neutralization device may be either an installation type or a handy type. For the type of neutralization device, a bar type, an overhead console type, a desktop type (blower type or fan type), a nozzle type (spot type), a gun type, a pen type, a box type, or the like is used, for example.

Examples of the applied voltage method of the neutralization device include a Direct Current (DC) method, a pulse DC method, an SSDC method, an Alternating Current (AC) method, a high frequency AC method, a pulse AC method, an HDC-AC method, and the like.

The voltage of the high voltage power supply may be, for example, equal to or higher than 100 V, preferably equal to or higher than 1 kV, or equal to or higher than 2 kV. The upper limit of the voltage of the high voltage power supply is not particularly limited. The high voltage power supply may have various known conversion circuits as necessary.

In the neutralization device, an output voltage applied to the electrode, which is one of the electric parts, may preferably be equal to or higher than 1 kV, more preferably equal to or higher than 2 kV.

For the frequency of the high voltage power supply, a commercial frequency type of 50 Hz, 60 Hz, or the like, a low frequency type of several Hz to 30 Hz, or a high frequency type of substantially 20 kHz to 80 kHz may be used, for example.

The high voltage power supply may be a built-in power supply or an external power supply. A built-in power supply is installed, for example, inside the housing that accommodates the electronic part. An external power supply uses, for example, a power supply, a battery, or the like installed in a facility, where the electronic device is used.

For the electronic device of the present embodiment, an example using a bar type ionizer 100, which is one of the neutralization devices that generate corona discharge, will be described with reference to FIGS. 4 and 5A to 5C.

Figure 4:
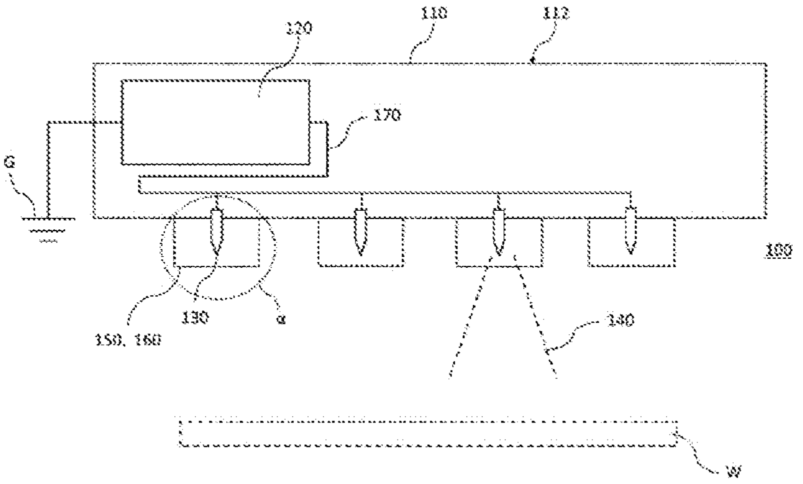
FIG. 4 is a cross-sectional diagram schematically showing a structure of an ionizer (a neutralization device).

FIG. 4 is a cross-sectional diagram schematically showing a structure of the ionizer 100.

Figure 5A:
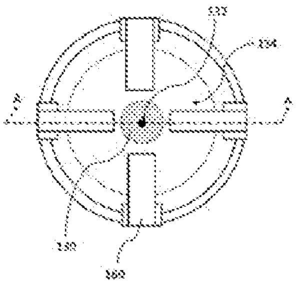
FIGS. 5A to 5C are diagrams showing enlarged diagrams of an α region in FIG. 4.
Figure 5B:
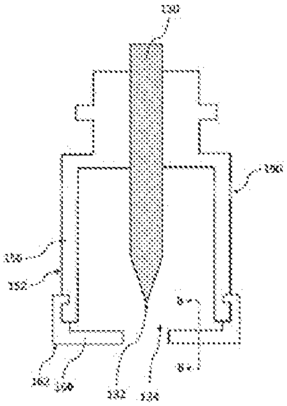
Figure 5C:
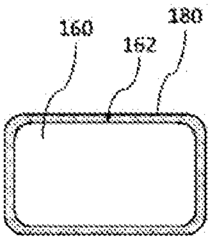

FIGS. 5A to 5C are diagrams showing enlarged diagrams of an α region in FIG. 4.

The ionizer 100 in FIGS. 5A to 5C includes one, or two or more electrodes 130 (electric parts), an interconnection portion 170 that transmits the electric power of the high voltage power supply 120 to the electrodes 130, a housing 110 that accommodates the electrodes 130 and the interconnection portion 170.

"Accommodation" means a state in which a part or the whole of the accommodated object is contained inside the internal space of the housing 110.

Either an electrode that generates a corona discharge or an electrode that generates a glow discharge is used for the electrode 130, and the electrode 130 is composed of a needle-shaped metal rod whose tip diameter gradually decreases, that is, a discharge needle.

As a constituent material of the electrode 130, tungsten, stainless steel, silicon, glass, or the like is used.

A metallic discharge needle made of such as tungsten and stainless steel, and a non-metallic discharge needle made of silicon (polysilicon) can be configured to contain the respective constituent materials with high purity, but other materials are allowed to be contained in small amounts as necessary. A discharge needle made of glass having a silicon coating on the surface can be used.

The number of electrodes 130, a pitch interval between the electrodes 130, a line length on which a plurality of electrodes 130 are installed (the length of the electrodes), and the like can be set in consideration of the installation location, the neutralization performance, and the like.

When the electric power is transmitted from the high voltage power supply 120 to the electrode 130 through the interconnection portion 170, ions 140 are discharged from the electrode 130. The electrification on the surface of the neutralization target object W can be neutralized (neutralization processing) by the discharged ions 140.

The voltage application method of the ionizer 100 can be selected from the methods described above and is not particularly limited, and for example, an alternating current method such as an Alternating Current (AC) method, a high frequency AC method, a pulse AC method, and an HDC-AC method may be used.

In the case of the AC method, an AC high voltage power supply 120 may be used, or a combination of a DC high voltage power supply 120 and an alternating current generation circuit may be used.

The high voltage power supply 120 included in the ionizer 100 in FIG. 4 is a built-in power supply accommodated in the housing 110 but is not limited to this aspect. According to the present embodiment, even when the high voltage power supply 120 is built in the housing 110, the induced electrification phenomenon occurring in the neutralization target object can be alleviated.

The ionizer 100 in FIG. 4 includes a cover portion (a nozzle portion 150, a guard portion 160) that covers at least a part of the electrode 130.

In the ionizer 100, the cover portion may be composed of a tube-shaped nozzle portion 150 and/or guard portion 160. An example of the tube-shaped nozzle portion 150 is provided in the housing 110 and may be configured to cover the periphery of the electrode 130. An example of the guard portion 160 is attached to the tube-shaped nozzle portion 150 in an attachable and detachable manner and may be configured to cover at least the tip 132 of the electrode 130.

FIGS. 5A to 5C are enlarged diagrams of the a region in FIG. 4 and a diagram schematically shows the electrode 130 installed in the cover portion. FIG. 5A is a diagram showing the electrode 130 in the axial direction viewed from the tip 132 side, FIG. 5B is a cross-sectional diagram taken along the line A-A in FIG. 5A, and FIG. 5C is a cross-sectional diagram taken along the line B-B in FIG. 5B.

In FIG. 5B, the cover portion has a first cover structure (the nozzle portion 150), which covers a periphery of the tip 132 of the electrode 130 and has a surface resistivity of equal to or higher than $10^4\Omega/\square$ and equal to or lower than $10^{11}\Omega/\square$, and a second cover structure (the guard portion 160), which covers a front side of the tip 132 of the electrode 130 and has a surface resistivity of equal to or higher than $10^4\Omega/\square$ and equal to or lower than $10^{11}\Omega/\square$.

The ionizer 100 including the electrode 130 may have only the first cover structure, but it is preferable to have an aspect that the ionizer 100 has both the first cover structure and the second cover structure.

The nozzle portion 150 has a socket structure that supports a part of a rear side of the electrode 130 and is attached to a mounting hole of the housing 110 in an attachable and detachable manner. When the electrode 130 is worn out, it is possible to replace the nozzle portion 150 that has a new electrode 130, thereby the maintenance becomes easier. A known method such as mechanical coupling can be used for an attachment and detachment method.

The nozzle portion 150 and the housing 110 may be configured as separate members but may be configured as an integrated member in which both members are integrated.

The nozzle portion 150 may have one, or two or more hole portions 190 in a wall portion that covers the periphery of the electrode 130 in the axial direction. Air can be supplied through the hole portion 190, and the neutralization characteristics of the electrode 130 can be adjusted. Air may be configured to be supplied from a compressor in housing 110.

The nozzle portion 150 may have a cover structure that covers at least a part of the surface of the electrode 130 in a circumferential direction with respect to the axial direction and may have a tube-shaped first cover structure covering the entire circumferential surface from a portion of the electrode 130 protruding from the socket structure to the tip 132 thereof.

Further, the guard portion 160 has a second cover structure that covers an opening 134 of the nozzle portion 150 present in the front side of the tip 132 of the electrode 130. Such a guard portion 160 can prevent the tip 132 of the electrode 130 in the opening 134 shown in FIG. 5A from accidentally touching by an operator, and thus the guard portion 160 functions as a finger guard.

The guard portion 160 is attached to the nozzle portion 150 in an attachable and detachable manner. Only the guard portion 160 can be replaced. A known method such as mechanical coupling can be used for an attachment and detachment method.

The guard portion 160 and the nozzle portion 150 may be configured as separate members or may be configured as an integrated member.

The ionizer 100 of the present embodiment has at least one of Configuration A: a cover portion (the nozzle portion 150 and/or the guard portion 160), which covers at least a part of the electrode 130 (the electric part) and has a surface resistivity of the cover portion of equal to or higher than $10^4\Omega/\square$ and equal to or lower than $10^{11}\Omega/\square$, and Configuration B: the housing 110, which has the surface resistivity of equal to or higher than $10^4\Omega/\square$ and equal to or lower than $10^{11}\Omega/\square$, or preferably has both Configuration A and Configuration B.

The surface resistivities of Configuration A and Configuration B may be the same or different from each other.

The ionizer 100 may have only Configuration A, may have only Configuration B, or may preferably have both Configuration A and Configuration B.

Configuration A: the surface resistivity of the cover portion is equal to or higher than $1.0\times10^4\Omega/\square$ and equal to or lower than $1.0\times10^{11}\Omega/\square$, is preferably equal to or higher than $1.0\times10^4\Omega/\square$ and equal to or lower than $1.0\times10^{11}\Omega/\square$, is more preferably equal to or higher than $1.0\times10^4\Omega/\square$ and equal to or lower than $1.0\times10^9\Omega/\square$, and is further more preferably equal to or higher than $1.0\times10^5\Omega/\square$ and equal to or lower than $1.0\times10^9\Omega/\square$.

Configuration B: the surface resistivity of the housing 110 may be the same or different from each other, is equal to or higher than $1.0\times10^4\Omega/\square$ and equal to or lower than $1.0\times10^{11}\Omega/\square$, is preferably equal to or higher than $1.0\times10^4\Omega/\square$ and equal to or lower than $1.0\times10^{10}\Omega/\square$, is more preferably equal to or higher than $1.0\times10^4\Omega/\square$ and equal to or lower than $1.0\times10^9\Omega/\square$, and is further more preferably equal to or higher than $1.0\times10^5\Omega/\square$ and equal to or lower than $1.0\times10^9\Omega/\square$.

In the present specification, as the surface resistivity, a surface resistivity meter that is defined by IEC 61340 5-1, 5-2 standards (conformed to ESD Association standards) can be used, and a value ($\Omega/\square$) that is measured using a CR probe or 2P probe can be adopted, under an environment of Temperature: 22.5° C.±10%, Humidity: 50% RH±5° C., for example.

By providing at least one of the above described Configuration A and Configuration B, the induced electrification phenomenon caused in the neutralization target object W by the electric field generated from the ionizer 100 can be alleviated.

Although the detailed mechanism is not defined, by providing the cover portion or the housing having the above described surface resistivity, an increase in the number of attraction of the ions generated from the electrode 130 can be suppressed as compared to a conductive material while smoothing the movement of the charge as compared to an insulating material, and thereby it is considered that and the deterioration of the neutralization performance of the ionizer 100 can be suppressed while reducing the induced voltage that is generated in the neutralization target object W when the neutralization is performed.

When the surface resistivity of the housing 110 is set to A and the surface resistivity of the cover portion is set to B, the ionizer 100 may be configured such that A and B satisfy $10^3/10^{12}\leq A/B<1$, preferably $10^4/10^{11}\leq A/B<1$, more preferably $10^4/10^9\leq A/B<1$, for example. As a result, it is possible to smoothly perform the movement of the charge from the cover portion to the housing 110 while suppressing deterioration of the neutralization performance due to the cover portion.

As another aspect, the ionizer 100 may be configured such that A and B satisfy $1<A/B\leq10^3/10^{12}$, for example.

In the ionizer 100, at least one of the housing 110 and the cover portion (the nozzle portion 150 and the guard portion 160) may be configured to include a layer that has an insulation property or a conductive property, and an electrostatic dissipation layer 180 that is formed on at least a part of a surface of the layer and that has a surface resistivity of equal to or higher than $10^4\Omega/\square$ and equal to or lower than $10^{11}\Omega/\square$.

Here, in the technical field of ionizers, it is common practice to use an insulating material and not use a conductive material for a nozzle having a discharge needle or a finger guard for the nozzle. This is because the conductive material attracts the ions discharged from the discharge needle, which may reduce the neutralization performance of the ionizer, and as a result, the neutralization target object W may not be sufficiently neutralized. However, when a normal insulating material is used, as described above, the induced voltage that is generated in the neutralization target object W is increased, and there is a risk of the occurrence of the ESD.

On the other hand, by adopting either a first laminated structure in which an electrostatic dissipation layer is laminated over an insulating layer or a second laminated structure in which an electrostatic dissipation layer is laminated over a conductive layer, it is possible to reduce the induced voltage, which is generated in the neutralization target object W when the neutralization is performed, while suppressing the deterioration of the neutralization performance of the ionizer.

Such a laminated structure is formed in at least one or more of the nozzle portion 150 that covers the periphery of the electrode 130 in the axial direction, the guard portion 160 present between the tip 132 of the electrode 130 and the neutralization target object W, and the housing 110 in which the electrode 130 is installed, so that the induced electrification phenomenon that occurs in the neutralization target object W can be alleviated.

Among these, it is preferable that the laminated structure is formed on the guard portion 160 installed at a position that hinders the traveling direction of ions generated from the electrode 130. As a result, the induced voltage can be further reduced. Further, more preferably, the laminated structure is formed on the guard portion 160 and the nozzle portion 150, and further more preferably, the laminated structure is formed on the nozzle portion 150, the guard portion 160, and the housing 110. By forming the above-mentioned laminated structure on a member with which the guard portion 160 contacts or on a separate member with which the member further contacts, the induced voltage that is generated in the neutralization target object W can be further reduced. Although the detailed mechanism is not defined, the movement of the ions that are generated from the electrode 130 is smooth through the guard portion 160, thereby it is considered that the induced voltage, which is generated in the neutralization target object W when the neutralization is performed, can be reduced.

The measurement of the surface resistivity of the electrostatic dissipation layer 180 in the laminated structure is not performed singly, the measurement is performed in a state in which the electrostatic dissipation layer 180 is laminated on the insulating layer or the conductive layer, which is a base layer. For example, by using a base layer of the conductive layer, it is possible to adjust a value of the surface resistivity to be smaller than in the case of using a single layer.

In the insulating layer in the first laminated structure, a thermoplastic resin such as an ABS, a PC, a PE, a PP, a PMMA, a PS, a PVC, a POM, other elastomer resins or an engineering plastic resin, a polymer alloy resin containing two or more of these resins can be used, for example. The thermoplastic resin is lighter than a metal material, has excellent moldability, and can be formed into a desired member shape.

Further, in the conductive layer in the second laminated structure, a metal material such as a steel material such as alloy steel such as SUS, SPCC, and SOOC, and an alloy material such as Al alloy and Cu alloy may be used, and it is possible to use a conductive resin obtained by kneading a conductive material such as carbon or Ag into the above resin such as the thermosetting resin.

Although the detailed mechanism is not defined, while the first laminated structure has a configuration in which the charge moves through the electrostatic dissipation layer formed on the surface of the base, the second laminated structure has a configuration in which the charge, which is moved from the electrostatic dissipation layer to the base of the conductive layer, can move in the conductive layer as well as in the electrostatic dissipation layer, thereby it is considered that the induced electrification phenomenon can be alleviated more efficiently.

Examples of a method of forming the electrostatic dissipation layer over the insulating layer or the conductive layer include a method of forming a coating film using a coating material, a method of laminating a thin film, a method of molding using a molding material, and the like. The electrostatic dissipation layer may be formed alone, but it is also possible to simultaneously form the base layer of the insulating layer or the conductive layer and the electrostatic dissipation layer by using a technique such as two-color molding.

Each of the housing 110, the nozzle portion 150, and the guard portion 160 may be composed solely of an electrostatic diffusive material and may be configured by combining a conductive material and an electrostatic diffusive material, or an insulating material and an electrostatic diffusive material to have the above described laminated structure.

The housing 110, the nozzle portion 150, and the guard portion 160 may use the same or different electrostatic diffusive material, conductive material, and insulating material.

Examples include a coating product in which a coating film of the electrostatic diffusive material is formed on at least one of an outer surface and/or an inner surface of the housing 110 made of an insulating resin, a two-color molded product in which a film of the electrostatic diffusive material is formed on at least one of the outer surface and/or the inner surface of the housing 110 made of the insulating resin.

The cover portion in the ionizer 100 has a cover structure (the nozzle portion 150) that covers the periphery of the electrode 130 and/or a cover structure (the guard portion 160) that covers the front side of the tip 132 of the electrode 130 and may be configured such that the surface resistivities of the cover structures are equal to or higher than $10^4 \Omega/\square$ and equal to or lower than $10^{11} \Omega/\square$. As a result, the induced electrification phenomenon from the electrode 130 can be alleviated.

Here, the front side means a front side when viewed in a direction from the tip 132 of the electrode 130 to the neutralization target object W.

Further, ranges of numerical values of the surface resistivities of the nozzle portion 150 and the guard portion 160 are applied to the case where the electrostatic diffusive material is used alone and also applied to the case where the configuration is made to have the above-described laminated structure.

The electrostatic dissipation layer 180 is formed over the surface 162 of the guard portion 160 in FIG. 5C. The electrostatic dissipation layer 180 may cover at least a part of the surface 162 and may cover the entire surface. That is, an example of the guard portion 160 may be composed of an internal structure of an insulating material or a conductive material and a coating layer of an electrostatic diffusive material formed on a surface of the internal structure. This configuration can also be applied to the nozzle portion 150 or the housing 110.

The electrostatic dissipation layer 180 is composed of, for example, a film (a coating film) made of an electrostatic diffusive coating material. By applying the electrostatic diffusive coating material over the surface 162 of the guard portion 160 and drying the electrostatic diffusive coating material, a dry film of the electrostatic diffusive coating material, that is, the electrostatic dissipation layer 180 is formed. By using the coating material, the electrostatic dissipation layer 180 can be stably formed relatively uniformly over the surface 162 of the guard portion 160 having various shapes during manufacturing.

Further, a grid shape of the guard portion 160 is not particularly limited as long as the guard portion 160 covers the tip 132 of the electrode 130, and examples of the grid shape include a radial shape, a lattice shape, a slit shape, a cross shape, a concentric shape, a woven fabric shape such as plain weave, twill weave, twisted weave, and herringbone weave, and the like. As a result, the induced electrification phenomenon from the discharge electrode can be alleviated.

The ionizer 100 and the cover portion may be configured to be electrically connected. As a result, the induced electrification phenomenon can be alleviated more efficiently.

Further, in the present embodiment, when the ionizer 100 includes a plurality of electrodes 130, the ionizer 100 may be configured to include at least a first electrode, a second electrode, a first cover portion that covers the first electrode, and a second cover portion that covers the second electrode, and may be configured such that the first cover portion and the second cover portion are electrically connected to each other. As a result, the induced electrification phenomenon can be alleviated more efficiently.

The housing 110 may be in a grounded state, and the cover portion (the nozzle portion 150 and/or the guard portion 160) may be electrically connected to the housing 110 that is in the grounded state. As a result, the induced electrification phenomenon can be alleviated more efficiently.

The neutralization device of the present embodiment is applicable not only to a bar type ionizer 100 but also to other ionizers. FIGS. 6A to 6D and 7A to 7B are diagrams schematically showing structures of other ionizers.

Figure 6A:
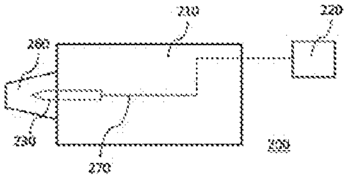
FIGS. 6A to 6D are diagrams schematically showing a structure of another ionizer.

FIG. 6A shows a box type ionizer 200. The ionizer 200 includes an electrode 230, an interconnection portion 270 that supplies electric power from a high voltage power supply 220 to the electrode 230, a housing 210 that accommodates the electrode 230 and the interconnection portion 270, and a nozzle member 260 that covers at least a part of the electrode 230.

Figure 6B:
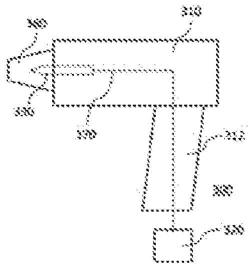

FIG. 6B shows a handgun type ionizer 300. The ionizer 300 includes an electrode 330, an interconnection portion 370 that supplies electric power from a high voltage power supply 320 to the electrode 330, a housing 310 that accommodates the electrode 330 and the interconnection portion 370, a nozzle member 360 that covers at least a part of the electrode 330, and a grip portion 312 to be held by an operator.

Figure 6C:
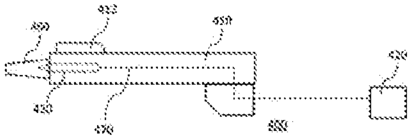

FIG. 6C shows a pen type ionizer 400. The ionizer 400 includes an electrode 430, an interconnection portion 470 that supplies electric power from a high voltage power supply 420 to the electrode 430, a housing 410 that accommodates the electrode 430 and the interconnection portion 470, a nozzle member 460 that covers at least a part of the electrode 430, and a switch portion 412 that serves as a trigger for discharging ions from the electrode 430.

Figure 6D:
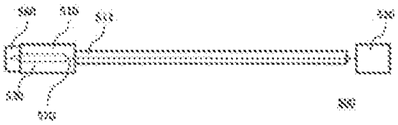

FIG. 6D shows a nozzle type ionizer 500. The ionizer 500 includes an electrode 530, an interconnection portion 570 that supplies electric power from a high voltage power supply 520 to the electrode 530, a housing 510 that accommodates the electrode 530 and the interconnection portion 570, a nozzle member 560 that covers at least a part of the electrode 530, and a deformable tube portion 512.

Figure 7A:
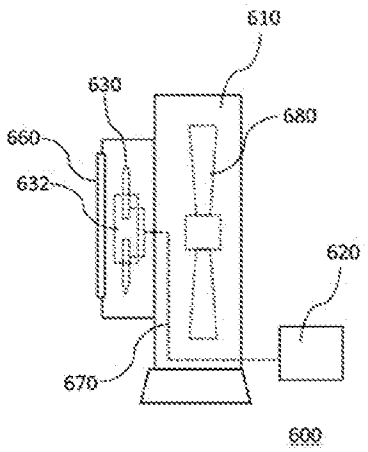
FIGS. 7A and 7B are diagrams schematically showing a structure of still another ionizer.
Figure 7B:
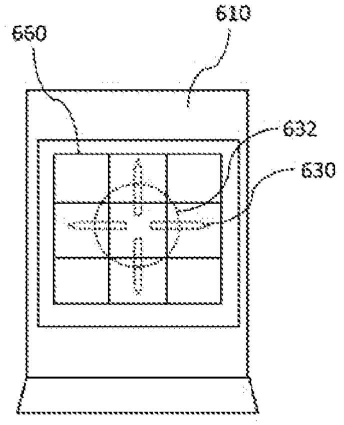

FIGS. 7A and 7B show a blower type ionizer 600. FIG. 7A is a side view and FIG. 7B is a front view. The ionizer 600 includes a plurality of electrodes 630, a support portion 632 that supports the electrode 630, an interconnection portion 670 that supplies electric power from a high voltage power supply 520 to the electrode 630, a housing 610 that accommodates the electrode 630 and the interconnection portion 670, a louver portion 660 that covers at least a part of a front side of the electrode 630, and a fan portion 680 that is disposed at a rear side of the electrode 630 and sends air from the electrode 630 toward the louver portion 660.

The ionizers 200, 300, 400, 500, and 600 include the nozzle member 260, the nozzle portion 360, the nozzle portion 460, the nozzle portion 560, and the louver portion 660, respectively, as a cover portion. These cover portions and housings can adopt the same configurations as the cover portions and the housings of the ionizer 100.

In such an ionizer, as with the ionizer 100, the induced electrification phenomenon can be alleviated.

The electronic device of the present embodiment can be used at a site in manufacturing and assembling processes of the neutralization target object such as the electronic part or the electronic machine.

Further, the electronic device of the present embodiment can be suitably used around or inside a device used in pre-processing or post-processing process in a semiconductor manufacturing process.

Examples of the device used in the semiconductor manufacturing process include a wire bonding device, a chip bonding device, a CVD, a PVD, a transporting device (a silicon wafer), an IC tester, a burn-in device, a dicing device, a grinder device, a semiconductor-related device such as an SMT device, an LCD-related device such as an LCD substrate cutting device and transporting device (an LCD substrate), and the like.

One of the manufacturing methods of the electronic device of the present embodiment is a manufacturing method of an electronic device, which is used around a neutralization target object and which includes an electric part, an interconnection portion that transmits electric power of a high voltage power supply to the electric part, and a housing that accommodates the electric part and the interconnection portion, the manufacturing method includes an assembling process of obtaining the electronic device by assembling constituent parts of the electronic device by using at least one of a cover portion, which has a surface resistivity of equal to or higher than $10^4\Omega/\square$ and equal to or lower than $10^{11}\Omega/\square$ and covers at least a part of the electric part, and the housing, which has a surface resistivity of equal to or higher than $10^4\Omega/\square$ and equal to or lower than $10^{11}\Omega/\square$.

By assembling the electronic device using the constituent parts having appropriately surface resistivities, it is possible to realize the alleviation of the induced electrification phenomenon that occurs in the neutralization target object present around the electronic device when using the electronic device.

Further, the manufacturing method of an electronic device according to the present embodiment may include a film formation process of forming a film, which is made of an electrostatic diffusive coating material having a surface resistivity of equal to or higher than $10^4\Omega/\square$ and equal to or lower than $10^{11}\Omega/\square$, on the surface of a resin layer that has an insulation property or a conductive property, for at least one of the housing and the cover portion. As a result, the induced voltage, which is generated in the neutralization target object W when the neutralization is performed, can be reduced.

One of the assembly methods of the neutralization device of the present embodiment includes, in the cover portion such as the nozzle portion or the guard portion, a process of forming an electrostatic dissipation layer having a surface resistivity of equal to or higher than $10^4\Omega/\square$ and equal to or lower than $10^{11}\Omega/\square$ on the surface and a process of attaching the cover portion formed with the electrostatic dissipation layer to the neutralization device. As a result, the electrostatic induction suppressing performance in the neutralization device can be improved.

Further, the assembling process may include a process of removing the cover portion from the neutralization device. As a result, the replacement is possible for each part.

As the method of forming the electrostatic dissipation layer, the above-described method can be adopted, but a method of applying by using the electrostatic diffusive coating material may also be used. As a result, workability and ease of maintenance can be improved.

The cover portion (the nozzle portion, the guard portion, the louver portion, or the like) of the present embodiment is used for a neutralization device, specifically an ionizer, and has a surface resistivity of equal to or higher than $10^4\Omega/\square$ and equal to or lower than $10^{11}\Omega/\square$. The cover portion may have the laminated structure as described above.

The outline of the electrostatic diffusive material of the present embodiment will be described below.

According to the electrostatic diffusive material of the present embodiment, it is possible to appropriately control the surface resistivity in the constituent parts of the electronic part or the electronic machine, thereby an electronic part and an electronic machine having excellent induction electrification resistance can be provided.

Among these, it is possible to alleviate the induced electrification phenomenon that occurs when the neutralization is performed using the ionizer. Therefore, the electrostatic diffusive material can be applied to the electronic part or the electronic machine in which a higher level of measures against induced voltage is required, or the manufacturing and assembling processes thereof.

In the present specification, an insulation property is defined when the surface resistivity is higher than $10^{11}\Omega/\square$, an electrostatic diffusive property is defined when the surface resistivity is equal to or higher than $10^4\Omega/\square$ and equal to or lower than $10^{11}\Omega/\square$, and a conductive property is defined when the surface resistivity is lower than $10^4\Omega/\square$.

The electrostatic diffusive material may be a molding material for molding constituent members of the electronic part or the electronic machine or may be a coating material, a film material, or the like for coating the surfaces of the constituent members of the electronic part or the electronic machine.

The molding material can be molded into a molded product that is a part or the whole of the constituent part by using a normal molding method such as an injection molding, a press molding, an insert molding, a two-color molding, or the like.

That is, the molded product may be composed of an electrostatic diffusive material alone and may be configured to have at least a laminated structure in which an electrostatic dissipation molded layer, which is made of an electrostatic diffusive material, is laminated on the surface over the insulating layer or the conductive layer.

Further, the coating material can form an electrostatic diffusive coating film on the surface of the insulating member or the conductive member in the constituent part by using a method of applying the coating material over the surface of the constituent part.

Further, the film material can form an electrostatic diffusive film on the surface of the insulating member or the conductive member in the constituent part by using a method of chemically and/or physically bonding over the surface in the constituent part.

The electrostatic diffusive material is configured such that the surface resistivity of the electrostatic dissipation layer such as the electrostatic dissipation molded layer, the electrostatic diffusive coating film, or the electrostatic diffusive film in the laminated structure is, for example, equal to or higher than $10^4\Omega/\square$ and equal to or lower than $10^{11}\Omega/\square$, is preferably equal to or higher than $10^4\Omega/\square$ and equal to or lower than $10^{10}\Omega/\square$, and is more preferably equal to or higher than $10^5\Omega/\square$ and equal to or lower than $10^9\Omega/\square$.

In the laminated structure, the numerical value of the surface resistivity of the electrostatic dissipation layer can be changed according to a resistance value of the insulating layer or the conductive layer serving as a base layer.

By adopting an ABS resin layer as an example of the insulating layer, adopting a SUS plate as an example of the conductive layer, and appropriately adjusting the resistance value of the electrostatic diffusive material using the surface resistivity of the electrostatic dissipation layer as a guideline when the layers are used as base layers, it is possible to make the surface resistivity of the electrostatic dissipation layer in the laminated structure within the desired range.

The components of the electrostatic diffusive material are described below.

(Conductive Component)

The electrostatic diffusive material contains a conductive component.

Examples of the conductive component include a conductive resin and the like. As the conductive resin, a material containing a conductive additive as a material that imparts a function to a polymer material, or a conductive polymer having conductive property by the resin itself can be used.

The resistance value of the conductive resin is preferably equal to or higher than $10^4\Omega$ and equal to or lower than $10^{10}\Omega$, more preferably equal to or higher than $10^5\Omega$ and equal to or lower than $10^9\Omega$.

When the electrostatic diffusive material is used for a molding material, a coating material, a film material, or the like, it may further contain commonly used components, as necessary.

The electrostatic diffusive molding material may contain a conductive component and a resin component such as a thermoplastic resin and/or a thermosetting resin. An example of a manufacturing method of the electrostatic diffusive molding material is obtained by mixing a conductive component into a resin component by using a method such as kneading.

The electrostatic diffusive coating material may contain a conductive component and a binder component. In addition to the above components, the coating material may contain various additives and solvents.

The resistance value of the electrostatic diffusive coating material after film formation is preferably equal to or higher than $10^4\Omega$ and equal to or lower than $10^{11}\Omega$, more preferably equal to or higher than $10^5\Omega$ and equal to or lower than $10^9\Omega$.

(Binder Component)

As an example of the binder component, a binder resin can be used, and specifically, examples include a urethane resin, a polyester resin, a (meth)acrylic resin, a vinyl acetate resin, an epoxy resin, a fluorine resin, a phenolic resin, a silicone resin, a synthetic resin such as an amino alkyd resin, other synthetic and natural resins, and the like. The resins may be used alone or in a combination of two or more.

The coating film and the base can be bonded by the binder component. Further, as the binder component, one having physical properties suitable for the environment of use may be selected, and one in which additives can be dispersed may be selected.

Further, the binder resin is desirably a polymer conductive material that itself has conductive property.

A coating film using a polymer conductive material is considered to be configured with a state in which a conductive region is relatively uniformly mixed in an insulating region from a microscopic point of view as compared to a coating film using the binder resin that is an insulator, thereby adhesion can be improved, variations in conductive property in the coating film can be suppressed, and a stable electrostatic dissipation layer can be formed.

Further, by using the polymer conductive material, the content ratio of the additive can be adjusted to be low as necessary.

(Additive)

As the additive, those that control a state of the coating material and those that play a role in imparting properties after film formation can be used.

Examples of the additive include a conductive additive, a silicone additive, a silica powder, and the like, but additives that can be added are not limited to the above described additives. The additives may be used alone or in a combination of two or more.

The conductive additive can adjust the conductive property of the coating film. The material or amount of the conductive additive is selected according to the target resistance value or binder component. Examples of the conductive additive include a powdery or a fibrous material such as a carbon-based material, a metal-based material, a metal-oxide-based material, and a metal-oxide film-based material, as well as an ionic conductive property-imparting agent, an antistatic agent, and the like. These may be used singly or used in combination, and the configuration and materials are not limited.

The silicone additive can improve leveling and wettability.

The silica powder can impart thickening or matting.

(Solvent)

A solvent that contains a component capable of dissolving or dispersing the binder component or the additive can be used.

As the solvent, water or ethanol is preferable from the viewpoint of environmental performance. An organic solvent may be used since the organic solvent has a relatively high capability of dissolving the binder component and has a relatively wide selection range for the binder component. Further, from the viewpoint of coating film performance, the type of organic solvent that can enhance the adhesion to the base may be selected.

Further, the electrostatic diffusive coating material may be configured such that the electrostatic diffusive coating material does not substantially contain carbon black. As a result, the generation of particles can be suppressed, so that the electronic device of the present embodiment can be used in a clean room or a semiconductor manufacturing process.

In the ionizer of the electronic device, the surface of the cover portion may be coated with the coating film made of the electrostatic diffusive coating material that does not contain the carbon black. By not containing the carbon black in the coating film around the discharge electrode where corona discharge occurs, the generation of particles and dust can be further suppressed. In addition to the cover portion, the coating film on the surface of the housing may also be configured so as not to contain the conductive particles such as the carbon black. In the electrostatic diffusive coating material that does not substantially contain the conductive particles, the polymer conductive material can be used as the conductive component.

The electrostatic diffusive coating material may contain pigments and/or dyes as necessary. As a result, a region having an electrostatic diffusive property can be colored, so that the operator's visibility can be improved. Therefore, the handleability of the electronic device can be improved. As for the coloring color, for example, a color different from the color of the binder component such as the insulating binder resin can be adopted. Among these, black is generally recognized to be conductive, so the black may be adopted, but it is not limited to this.

(Antistatic Agent)

Further, an antistatic agent may be used as the electrostatic diffusive coating material.

By applying the antistatic agent on the surface of the constituent part, the antistatic property can be easily imparted and the surface resistivity of the surface can be appropriately controlled.

The antistatic agent may generally have weak adhesion to the base and peel off due to rubbing or solvents such as water, but since the antistatic performance can be achieved by applying the antistatic agent each time, the maintenance becomes easy. Further, when used in an environment where rubbing is unlikely to occur and where the solvent does not come into contact with the antistatic agent, the antistatic agent can maintain the antistatic performance for a relatively long period of time.

(Coating Method)

The coating method of the electrostatic diffusive coating material is not limited as long as a coating film is formed, and can be selected from known methods according to the type or shape of the base. Examples of the coating method include a brush coating method, a dipping (immersion) method, a spraying method, a gravure method, and the like.

Although the embodiments of the present invention have been described above, these are examples of the present invention, and various configurations other than the above can be adopted. Further, the present invention is not limited to the above-described embodiments and includes modifications, improvements, or the like within the scope of achieving the object of the present invention.

Examples of reference embodiments are added below.

1. An electronic device that is used around a neutralization target object, the electronic device includes: an electric part; an interconnection portion that transmits electric power of a high voltage power supply to the electric part; and a housing that accommodates the electric part and the interconnection portion, in which the electronic device has at least one of a configuration where a cover portion, which covers at least a part of the electric part, is included and a surface resistivity of the cover portion is equal to or higher than $10^4 \Omega/\square$ and equal to or lower than $10^{11} \Omega/\square$, and a configuration where a surface resistivity of the housing is equal to or higher than $10^4 \Omega/\square$ and equal to or lower than $10^{11} \Omega/\square$.

2. In the electronic device according to 1, at least one of the housing and the cover portion includes a layer that has an insulation property or a conductive property, and an electrostatic dissipation layer that is formed on at least a part of a surface of the layer and that has a surface resistivity of equal to or higher than $10^4 \Omega/\square$ and equal to or lower than $10^{11} \Omega/\square$.

3. In the electronic device according to 2, the electrostatic dissipation layer is composed of a film made of an electrostatic diffusive coating material.

4. In the electronic device according to 3, the electrostatic diffusive coating material contains a conductive component and a binder component.

5. In the electronic device according to any one of 1 to 4, the high voltage power supply includes an alternating current generation circuit.

6. In the electronic device according to any one of 1 to 5, the cover portion has a configuration in which a surface resistivity is equal to or higher than $10^4 \Omega/\square$ and equal to or lower than $10^9 \Omega/\square$.

7. In the electronic device according to any one of 1 to 6, when the surface resistivity of the housing is defined as A and the surface resistivity of the cover portion is defined as B, the A and B satisfy $10^3/10^{12} \leq A/B < 1$.

8. In the electronic device according to any one of 1 to 7, the electric part includes an electrode that generates a corona discharge or an electrode that generates a glow discharge.

9. In the electronic device according to 8, the cover portion has a cover structure, which covers a periphery of the electrode and/or has a cover structure, which covers a front side of a tip of the electrode, and a surface resistivity of the cover structure is equal to or higher than $10^4 \Omega/\square$ and equal to or lower than $10^{11} \Omega/\square$.

10. The electronic device according to 9 further includes at least: a first of the electrode; a second of the electrode; a first of the cover portion that covers the first of the electrode; and a second of the cover portion that covers the second of the electrode, in which the first of the cover portion and the second of the cover portion are configured to be electrically connected to each other.

11. The electronic device according to any one of 8 to 10 further includes: a tube-shaped nozzle portion that is provided in the housing and configured to cover a periphery of the electrode; and a guard portion that is attached to the tube-shaped nozzle portion in an attachable and detachable manner and configured to cover at least a tip of the electrode, in which the cover portion is composed of the tube-shaped nozzle portion and the guard portion.

12. In the electronic device according to 11, the housing and the cover portion are configured to be electrically connected to each other.

13. In the electronic device according to any one of 1 to 12, the housing is in a grounded state.

14. In the electronic device according to any one of 1 to 13, the neutralization target object is an electronic part or an electronic machine, and the electronic device is used at a site in manufacturing and assembling processes of the neutralization target object.

15. A manufacturing method of an electronic device that is used around a neutralization target object and that includes an electric part, an interconnection portion transmitting electric power of a high voltage power supply to the electric part, and a housing accommodating the electric part and the interconnection portion, the manufacturing method includes: an assembling process of obtaining the electronic device by assembling constituent parts of the electronic device by using at least one of a cover portion, which has a surface resistivity of equal to or higher than $10^4\Omega/\square$ and equal to or lower than $10^{11}\Omega/\square$ and covers at least a part of the electric part, and the housing, which has a surface resistivity of equal to or higher than $10^4\Omega/\square$ and equal to or lower than $10^{11}\Omega/\square$.

16. The manufacturing method of an electronic device according to 15 further includes: a film formation process of forming a film, which is made of an electrostatic diffusive coating material having a surface resistivity of equal to or higher than $10^4\Omega/\square$ and equal to or lower than $10^{11}\Omega/\square$, on a surface of a layer that has an insulation property or a conductive property, for at least one of the housing and the cover portion.

EXAMPLES

The present invention will be described in detail below with reference to Examples, but the present invention is not limited to the description of these Examples.

<Preparation of Electrostatic Diffusive Coating Material>

Manufacturing Example A 100 parts by weight of a polyurethane resin (Product name is Rezamin ME-44LP and manufactured by Dainichiseika Color & Chemical Mfg. Co., Ltd.) were added as a binder, 3.5 parts by weight of Ketchen black (Product name is Ketchen Black EC-300J and manufactured by Lion Specialty Chemical Co., Ltd.) were added as a conductive additive, and 150 parts by weight of dimethylformamide were added and 500 parts by weight of methyl ethyl ketone were added as a solvent, and then mixing and stirring were performed to obtain an electrostatic diffusive coating material A.

The obtained electrostatic diffusive coating material A was applied to a plate member, which is made of an ABS resin, as a target object by using an air spray gun, and a coating film was formed on the surface such that a thickness thereof after drying is 10 μm. The coating film was dried in an oven at 60° C. for 1 hour to obtain an electrostatic dissipation layer A.

As a result of measuring a surface resistivity of the electrostatic dissipation layer A by using the following method, a value of $1.0\times10^5$ ($\Omega/\square$) was obtained under a controlled environment of Temperature: 22.5° C.±10% Humidity: 50% RH±5° C.

As for the measurement method of the surface resistivity, a surface resistivity meter that is defined by IEC 61340 5-1, 5-2 standards (conformed to ESD Association standards) was used, and a value that is measured using a CR probe or 2P probe was defined as a surface resistivity ($\Omega/\square$).

Manufacturing Example B 100 parts by weight of a polyurethane resin (Product name is Crisbon ASPU-112 and manufactured by DIC Co., Ltd) were added as a binder, 13 parts by weight of a white conductive filler (Product name is Dentol WK-200B and manufactured by Otsuka Chemical Co., Ltd.) were added as a conductive additive, and 750 parts by weight of isopropyl alcohol were added as a solvent, and then mixing and stirring were performed to obtain an electrostatic diffusive coating material B.

The obtained electrostatic diffusive coating material B was applied to a plate member, which is made of an ABS resin, as a target object by using an air spray gun, and a coating film was formed on the surface such that a thickness thereof after drying is 10 μm. The coating film was dried in an oven at 60° C. for 2 hours to obtain an electrostatic dissipation layer B.

As a result of measuring a surface resistivity of the electrostatic dissipation layer B in the same manner as the electrostatic dissipation layer A, a value of $1.0\times10^6$ ($\Omega/\square$) was obtained under the controlled environment of Temperature: 22.5° C.±10% Humidity: 50% RH±5° C.

<Measurement of Induced Voltage in Neutralization Target Object>

FIG. 1 schematically shows a connection diagram of a measurement machine in the measurement system 10.

Figure 2:
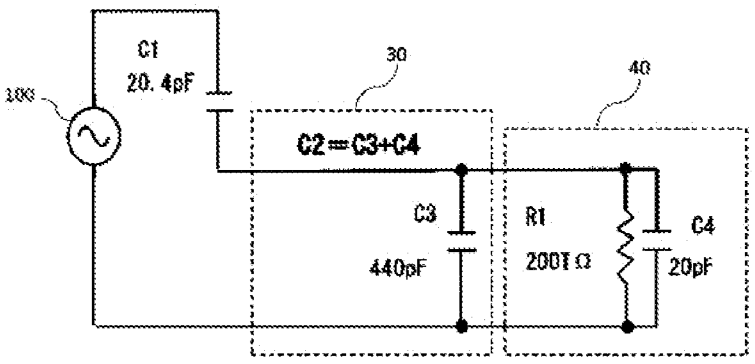
FIG. 2 is an equivalent circuit diagram showing a relationship between electrostatic capacitance of each of portions in the measurement system 10 in FIG. 1.

FIG. 2 shows an equivalent circuit diagram showing a relationship between electrostatic capacitance of each of the portions in the measurement system 10.

Such a measurement system 10 in FIG. 1 can measure the induced voltage that the ionizer 100 causes in the neutralization target object W by using neutralization.

Specific measurement procedures (1) to (3) of the induced voltage are as follows.

(1) Preparation of Measurement System 10 Shown in FIG. 1

A capacitive voltage division type electrification plate 20 was prepared by forming a three-process structure in an insulated state by using metal plates 22, 24, and 26 of Ω150 mm.

Each of the metal plates 24 and 26 of the capacitive voltage division type electrification plate 20 was connected to an electrometer 40 (6517A manufactured by KEITHLEY) through a triple coaxial cable 30 (237-ALG-2 manufactured by TEKTRONIX). An analog OUT terminal of the electrometer 40 was connected to a monitor 50 (Oscilloscope TDS503B manufactured by TEKTRONIX) through a cable.

The ionizer 100 was used as one of the neutralization devices having a high voltage power supply E. The ionizer 100 was disposed at an upper portion of the uppermost metal plate 22 of the capacitive voltage division type electrification plate 20 at a distance of a measurement distance D.

In FIG. 1, G represents ground. The capacitance in FIG. 2 showing an equivalent circuit diagram of the measurement system 10 in FIG. 1 was measured by using a capacitance meter.

(2) Calculation of $V_{out}$ and Voltage Division Ratio (C2/C1) in Capacitive Voltage Division Type Electrification Plate 20

Figure 3:
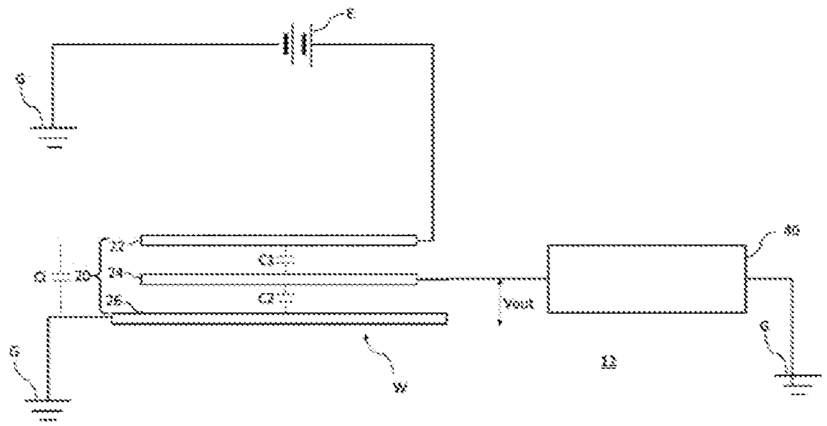
FIG. 3 is a diagram for describing a measurement method of an induced voltage.

FIG. 3 is a diagram for describing the measurement method of the induced voltage.

A measurement system 12 shown in FIG. 3 was prepared by electrically connecting a voltage supply E, the same capacitive voltage division type electrification plate 20 as in (1) above, and an electrometer 40. In FIG. 3, G represents ground.

In measurement system 12, a DC voltage supply E, which is calibrated to $E_0$ (V) was connected to a metal plate 22, and a metal plate 24 was connected to the electrometer 40.

Here, the electrostatic capacitance between the metal plates 22 and 24 is set to C1, the electrostatic capacitance between the metal plates 24 and 26 is set to C2, and an output voltage measured by the electrometer 40 is set to $V_{out}$.

A connection circuit in the measurement system 12 satisfies Equation 1: $V_{out}=[C1/(C1+C2)]\times E_0$.

By modifying Equation 1, Equation 2 is obtained: $C2/C1=(E_0/V_{out})-1$, and from Equation 2, a voltage division ratio P defined by C2/C1 can be calculated.

Based on Equation 2, $V_{out}$ was measured using the measurement system 12 in FIG. 3, and the voltage division ratio P was obtained from the obtained measured value of $V_{out}$.

The combined capacitance $Ci=(C1\times C2/(C1+C2))$ viewed from the voltage supply E was within a range of 20 pF±2 pF, and C1 was 20.4 pF and C2 was 460 pF. The capacitance was measured by using a capacitance meter.

(3) Calculation of Electrostatic Voltage

By replacing the voltage supply E in FIG. 3 with a predetermined ionizer 100, an induced voltage $V_{ei}$, which is electrostatically induced in the uppermost metal plate 22 in FIG. 1, is obtained by multiplying $V_{out}$ that is measured in FIG. 1 by the voltage division ratio P obtained in (2) above. That is, the induced voltage $V_{ei}$ is obtained based on Equation 3: $V_{ei}$=voltage division ratio P×$V_{out}$.

The $V_{out}$ in FIG. 1 was measured by adopting the ionizers shown in Experimental Examples 1 to 4 and environmental conditions, and the induced voltage $V_{ei}$ was calculated based on Equation 3 by using $V_{out}$.

Comparative Example

Experimental Example 1

Under the conditions of Temperature: 24° C., Humidity: 38% RH, Measurement distance D: 100 mm, Air pressure: No wind, according to the above procedures (1) to (3), $V_{out}$ in the measurement system 10 in FIG. 1 was measured, and the induced voltage $V_{ei}$ that is electrostatically induced in the uppermost metal plate 22 was obtained.

The outline of the structure of the ionizer 100 used in the measurement system 12 in FIG. 1 is shown in FIG. 4.

FIG. 4 is a cross-sectional diagram schematically showing the structure of the ionizer 100 used.

The ionizer used in Experimental Example 1 (AC corona discharge method) has a high voltage power supply 120 (AC type high voltage power supply, output voltage: 10 $kV_{0\text{-}p}$) accommodated in the housing 110, which is made of an ABS resin, and ten electrodes 130 (tungsten discharge needle, electrode length: 600 mm, a pitch between electrodes: 250 mm). FIGS. 5A to 5C show enlarged diagrams of an α region in FIG. 4. As shown in FIGS. 5A to 5C, the electrode 130 is disposed inside a tube portion of a nozzle portion 150, which is made of an ABS resin, and the guard portion 160 (the nozzle guard), which is made of an ABS resin, is attached to the tip of the nozzle portion 150 as a cover portion.

The induced voltage $V_{ei}$ in Experimental Example 1 was 294 $V_{p\text{-}p}$.

The surface resistivities of the housing 110 made of an ABS resin, the nozzle portion 150, and the guard portion 160 were $10^{16}$Ω/□.

EXAMPLES

Experimental Example 2

The induced voltage $V_{ei}$ was obtained in the same manner as in Experimental Example 1, except that the ionizer was used such that the electrostatic dissipation layer A was formed by applying the electrostatic diffusive coating material A using an air spray gun on the entire surface 112 of the housing 110 in FIG. 4 and the surface 152 of the nozzle portion 150 in FIG. 5B, by forming a coating film on the surface such that a thickness thereof after drying is 10 μm, and drying the coating film in an oven at 60° C. for 1 hour.

The induced voltage $V_{ei}$ in Experimental Example 1 was 162 $V_{p\text{-}p}$.

Experimental Example 3

The induced voltage $V_{ei}$ was obtained in the same manner as in Experimental Example 1, except that the ionizer was used such that the electrostatic dissipation layer A was formed by applying the electrostatic diffusive coating material A using an air spray gun on the entire surface 112 of the housing 110 in FIG. 4 and the surface 152 of the nozzle portion 150 in FIG. 5B, by forming a coating film on the surface such that a thickness thereof after drying is 10 μm, and drying the coating film in an oven at 60° C. for 1 hour, the electrostatic dissipation layer B was formed by applying the electrostatic diffusive coating material B using an air spray gun on the entire surface 162 of the guard portion 160 in FIG. 5C, by forming a coating film on the surface such that a thickness thereof after drying is 10 μm, and drying the coating film in an oven at 60° C. for 2 hours, and the electrostatic dissipation layer A over the housing 110 and the electrostatic dissipation layer B over the guard portion 160 are electrically connected by an interconnect and then grounded.

The induced voltage $V_{ei}$ in Experimental Example 1 was 52 $V_{p\text{-}p}$.

Experimental Example 4

The induced voltage $V_{ei}$ was obtained in the same manner as in Experimental Example 3, except that the measurement distance D was 300 mm.

The induced voltage $V_{ei}$ in Experimental Example 1 was 22 $V_{p\text{-}p}$.

By using the ionizers (the neutralization devices) of Experimental Examples 2 to 4, which are Examples, the result showed that the induced voltage, which is generated in the neutralization target object due to the electrostatic induction of the ionizer, can be reduced as compared to Experimental Example 1, which is a comparative example.

Further, in each of Experimental Examples 2 to 4, in any case of changing the surface resistivity of the guard portion 160 to $10^4$ Ω/□, $10^5$Ω/□, $10^7$Ω/□, $10^8$Ω/□, and $10^9$Ω/□, it was found that the induced voltage, which is generated in the neutralization target object due to the electrostatic induction of the ionizer, can be reduced as compared to Experimental Example 1.

Further, in the bar type ionizer 100 (the voltage application type neutralization device) used in Experimental Examples 2 to 4, in any case where the electrode length was changed to 350 mm, 1600 mm, or 3100 mm, the electrode was changed to a silicon discharge needle, or the power supply was changed to direct current, it was found that the induced voltage, which is generated in the neutralization target object due to the electrostatic induction of the ionizer, can be reduced as compared to Experimental Example 1 in which the electrode length was changed to the same conditions.

Further, in the box type ionizer, the gun type ionizer, the pen type ionizer, or the nozzle type ionizer having a built-in neutralization electrode and a nozzle, which is made of an ABS resin, covering the tip of the neutralization electrode, an example of forming the electrostatic dissipation layer B on the surface of the nozzle and an example of not forming the electrostatic dissipation layer B on the nozzle surface, were prepared. It was found that the ionizer having the electrostatic dissipation layer B can reduce the induced voltage, which is generated in the neutralization target object due to the electrostatic induction of the ionizer, as compared with the ionizer not forming the electrostatic dissipation layer B on the surface of the nozzle.

In the blowing type ionizer including a built-in neutralization electrode, a front louver, which is made of an ABS resin provided at a front side of the neutralization electrode, and a fan provided at a rear side, an example of forming the electrostatic dissipation layer B on the surface of the front louver and an example of not forming the electrostatic dissipation layer B on the surface of the front louver, were prepared. It was found that the blowing type ionizer having the electrostatic dissipation layer can reduce the induced voltage, which is generated in the neutralization target object due to the electrostatic induction of the ionizer, as compared with the ionizer not forming the electrostatic dissipation layer B on the surface of the front louver.

The neutralization device such as the ionizer of the Example can alleviate the induced electrification phenomenon that occurs when neutralization is performed during the manufacturing process or the assembling process of the neutralization target object, in the electronic part, the electronic machine, or the like that is a neutralization target object present around the neutralization device.

This application claims priority based on Japanese Patent Application No. 2020-104857 filed on Jun. 17, 2020, and the entire disclosure thereof is incorporated herein.

REFERENCE SIGNS LIST

10 Measurement system
12 Measurement system
20 Capacitive voltage division type electrification plate
22, 24, 26 Metal plate
30 Triple coaxial cable
40 Electrometer
50 Monitor
100 Ionizer (Neutralization device)
110 Housing
112 Surface
120 High voltage power supply
130 Electrode
132 Tip
134 Opening
140 Ion
150 Nozzle portion
152 Surface
160 Guard portion
162 Surface
170 Interconnection portion
180 Electrostatic dissipation layer
190 Hole portion
200 Ionizer
210 Housing
220 High voltage power supply
230 Electrode
260 Nozzle member
270 Interconnection portion
300 Ionizer
310 Housing
312 Grip portion
320 High voltage power supply
330 Electrode
360 Nozzle portion
370 Interconnection portion
400 Ionizer
410 Housing
412 Switch portion
420 High voltage power supply
430 Electrode
460 Nozzle portion
470 Interconnection portion
500 Ionizer
510 Housing
512 Tube portion
520 High voltage power supply
530 Electrode
560 Nozzle portion
570 Interconnection portion
600 Ionizer
610 Housing
620 High voltage power supply
630 Electrode
632 Support portion
660 Louver portion
670 Interconnection portion
680 Fan portion
E Voltage supply
W Neutralization target object

The invention claimed is:

1. An electronic device that is used around a neutralization target object, the electronic device comprising:

an electric part;

an interconnection portion that transmits electric power of a high voltage power supply to the electric part; and a housing that accommodates the electric part and the interconnection portion, wherein the electronic device includes at least one of a cover portion, which covers at least a part of the electric part and has a surface resistivity of equal to or higher than $10^4\Omega/\square$ and equal to or lower than $10^{11}\Omega/\square$, and the housing, which has a surface resistivity of equal to or higher than $10^4\Omega/\square$ and equal to or lower than $10^{11}\Omega/\square$, and wherein at least one of the housing and the cover portion includes a layer that has an insulation property or a conductive property, and an electrostatic dissipation layer that is formed on at least a part of a surface of the layer and that has a surface resistivity of equal to or higher than $10^4\Omega/\square$ and equal to or lower than $10^{11}\Omega/\square$.

2. The electronic device according to claim 1, wherein the electrostatic dissipation layer is composed of a film made of an electrostatic diffusive coating material.

3. The electronic device according to claim 2, wherein the electrostatic diffusive coating material contains a conductive component and a binder component.

4. The electronic device according to claim 1, wherein the high voltage power supply includes an alternating current generation circuit.

5. The electronic device according to claim 1, wherein the cover portion has a configuration in which a surface resistivity is equal to or higher than $10^4 \Omega/\square$ and equal to or lower than $10^9 \Omega/\square$.

6. An electronic device that is used around a neutralization target object, the electronic device comprising:

an electric part;

an interconnection portion that transmits electric power of a high voltage power supply to the electric part; and a housing that accommodates the electric part and the interconnection portion, wherein the electronic device includes at least one of a cover portion, which covers at least a part of the electric part and has a surface resistivity of equal to or higher than $10^4 \Omega/\square$ and equal to or lower than $10^{11} \Omega/\square$, and the housing, which has a surface resistivity of equal to or higher than $10^4 \Omega/\square$ and equal to or lower than $10^{11} \Omega/\square$, and wherein when the surface resistivity of the housing is defined as A and the surface resistivity of the cover portion is defined as B, A and B satisfy $10^3/10^{12} \leq A/B < 1$.

7. The electronic device according to claim 1, wherein the electric part includes an electrode that generates a corona discharge or an electrode that generates a glow discharge.

8. The electronic device according to claim 7, wherein the cover portion has at least one of a first cover structure, which covers a periphery of the electrode and has a surface resistivity of equal to or higher than $10^4 \Omega/\square$ and equal to or lower than $10^{11} \Omega/\square$, and a second cover structure, which covers a front side of a tip of the electrode and has a surface resistivity of equal to or higher than $10^4 \Omega/\square$ and equal to or lower than $10^{11} \Omega/\square$.

9. The electronic device according to claim 7, wherein at least a first electrode, a second electrode, a first cover portion that covers the first electrode, and a second cover portion that covers the second electrode are provided, and the first cover portion and the second cover portion are configured to be electrically connected to each other.

10. The electronic device according to claim 7, further comprising:

a tube-shaped nozzle portion that is provided in the housing and configured to cover a periphery of the electrode; and a guard portion that is attached to the tube-shaped nozzle portion in an attachable and detachable manner and configured to cover at least a tip of the electrode, wherein the cover portion is composed of the tube-shaped nozzle portion and the guard portion.

11. The electronic device according to claim 10, wherein the housing and the cover portion are configured to be electrically connected to each other.

12. The electronic device according to claim 1, wherein the housing is in a grounded state.

13. The electronic device according to claim 1, wherein the neutralization target object is an electronic part or an electronic machine, and the electronic device is used at a site in manufacturing and assembling processes of the neutralization target object.

14. A manufacturing method of an electronic device that is used around a neutralization target object and that includes an electric part, an interconnection portion transmitting electric power of a high voltage power supply to the electric part, and a housing accommodating the electric part and the interconnection portion, the manufacturing method comprising:

a film formation process of forming a film, which is made of an electrostatic diffusive coating material having a surface resistivity of equal to or higher than $10^4 \Omega/\square$ and equal to or lower than $10^{11} \Omega/\square$, on a surface of a layer that has an insulation property or a conductive property, for at least one of the housing and a cover portion, and an assembling process of obtaining the electronic device by assembling constituent parts of the electronic device by using at least one of the cover portion, which has a surface resistivity of equal to or higher than $10^4 \Omega/\square$ and equal to or lower than $10^{11} \Omega/\square$ and covers at least a part of the electric part, and the housing, which has a surface resistivity of equal to or higher than $10^4 \Omega/\square$ and equal to or lower than $10^{11} \Omega/\square$.

* * * * *